Patented Mar. 16, 1954

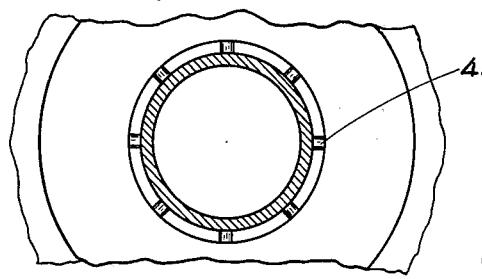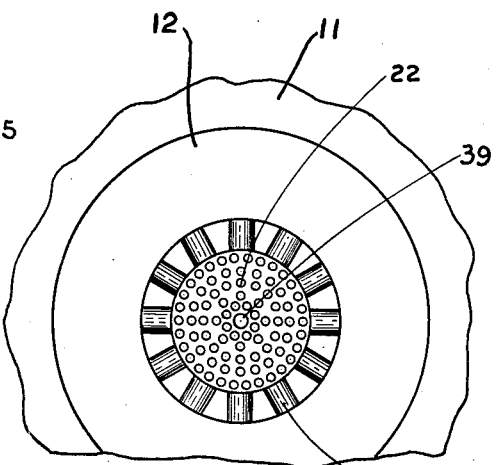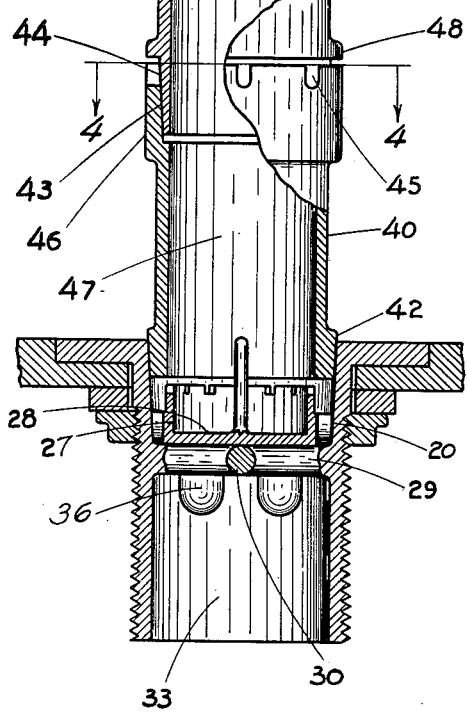

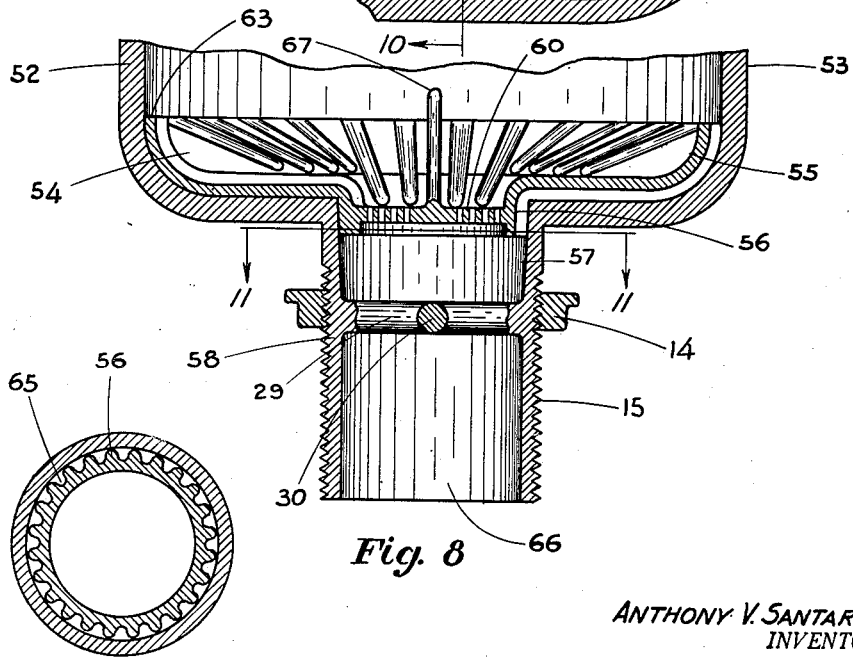

2,671,909

UNITED STATES PATENT OFFICE 2,671,909

REMOVABLE ATTACHMENT FOR LABORATORY WASTE DRAIN FITTINGS

Anthony V. Santarsiero, Bronx, N. Y., assignor to Catherine Cherico, New York, and Stephan L. Saunders, Carmel, N. Y.

Application July 19, 1949, Serial No. 105,538

5 Claims. (Cl. 4—287)

This invention relates to strainers, precipitate cups and other attachments for use in waste fittings and traps for chemical laboratory sinks.

Due to the wide range of materials and chemicals utilized in chemical and other types of laboratories, coupled with the frequency of breakage of bottles and other glass containers of various types, which drop into the sinks, clog up the drains and pipes, and cause a fire and explosion hazard, it is essential that solid matter, and particularly chemicals and precipitates that may cause explosions if they get into the pipes or traps and there react with other chemicals, be separated from the liquids and removed at regular intervals to allow free flow of water and other types of liquid down the drain pipes.

To minimize the corrosive action of chemicals used in laboratories, the sink waste fittings, drains and traps are generally made of lead, preferably chemically pure lead.

While the lead withstands the action of most of the chemicals used, some materials, such as mercury, which is an extremely heavy liquid and therefore tends to remain in the fittings, after the lighter liquids pass through, react with the lead of the fittings, and therefore tend to destroy them, after a short period.

It is, therefore, important that mercury and other similar materials be separated from the water and other liquids near the sink inlet, in such a manner, that the mercury will be retained near the inlet, and removed before it gets down into the pipes and traps.

It is also important that precipates of various types and broken glass, as well as filter paper and other solid matter, be kept out of the drain near the inlet openings of the fittings, so that the obstructions can be cleaned out at regular intervals, before they get down into the pipes and traps and clog the system.

The object of my invention is to provide removable strainers and attachments for laboratory and other types of drains and fittings, which can be readily removed and cleaned.

A further object is to provide attachments which are suitable for a wide variety of laboratory and other types of drains and fittings.

A further object is to provide for a drain fitting, a cup, which is adapted to catch and retain a quantity of mercury or other heavy liquid or injurious precipitates, and retain them in a convenient position for emptying and cleaning to keep these materials from the pipes thereby minimizing the explosion hazard.

Another object is to provide strainers and cups which are adapted to fit drainbowls of various types and other types of sink fittings used in laboratory plumbing.

A further object is to provide removable and adjustable overflow pipes which may be mounted in the fittings in conjunction with strainers and catch-cups.

A primary object is to provide a range of removable attachments for laboratory sink fittings and traps, which are simple, inexpensive to produce, can be readily removed and easily cleaned and reinstalled, and are adapted for installation in a wide range of plumbing fixtures for both laboratory and general use.

The accompanying drawings, illustrative of several embodiments and modifications of my invention, together with the description of their construction and the method of installation thereof, will serve to clarify further objects and advantages of my invention.

In the drawings:

Fig. 1 represents a vertical section through a drain fitting attached to a sink, with a strainer and cup mounted in the drain fitting, taken at 1—1, Fig. 5.

Fig. 2 is a plan view of the drain fitting and strainer of Fig. 1.

Fig. 3 represents a vertical section through the drain fitting of Fig. 1, with a series of over-flow pipe sections and a catch-cup mounted in the fitting.

Fig. 4 is a partial cross-section and partial plan view of the lower overflow pipe of Fig. 3, taken at 4—4, Fig. 3.

Fig. 5 is a cross-section thru the fitting of Fig. 1 and the auxiliary sumps formed in the cup taken at 5—5, Fig. 1.

Fig. 6 is a plan view of the cup shown in Figs. 1 and 2.

Fig. 7 is a vertical section through the cup of Fig. 6, taken at 7—7, Fig. 6.

Fig. 8 is a vertical section through a drainbowl, fitted with a removable strainer and corrugated strainer bowl taken at 8—8, Fig. 9.

Fig. 9 is a plan view of the drainbowl, strainer and corrugated strainer bowl, of Fig. 8.

Fig. 10 is a vertical section through the drainbowl, strainer and strainer bowl of Fig. 9 taken at 10—10, Fig. 9.

Fig. 11 is a cross-section through the bottom of the strainer taken at 11—11, Fig. 8.

It will be understood that the following description of the construction and utilization of the removable attachments for laboratory waste drain fittings, is intended as explanatory of the invention and not restrictive thereof.

In the drawings, the same reference numerals designate the same parts throughout the various views, except where otherwise indicated.

One embodiment of the construction, shown in Figs. 1 and 2, indicates laboratory drain fitting 10, made of cast chemically pure lead, or other suitable material which is not affected by most of the chemicals generally encountered, attached to the bottom of a sink 11, a substantially circular flange 12, formed integral with the body of the fitting, being seated in a counterbore formed in the bottom of the sink, so that the top of the fitting flange is relatively flush with the inner surface of the bottom of the sink.

The fitting may be attached to the sink by a nut 14, of hexagonal or other suitable form, which is mounted on the threads 15, formed in the outer circumference of the tubular mounting section of the fitting, a circular washer face 16 of the nut, pressing a washer or spacer 17, against the under surface of the bottom of the sink.

A strainer 19 made of cast chemically pure lead or a similar material, of circular or other suitable form, as indicated in Fig. 2, may be fitted to a tapered or other form of counterbore 20, formed in the upper portion of the fitting, a relatively thin flange 21, formed integral with the body of the strainer projecting above the top of the flange 12, to enable the strainer to be readily removed for cleaning or other purposes.

A plurality of openings 22, of circular or other suitable form, may be cut through the lower wall 23, of the strainer, which is formed integral with the cylindrical strainer body 24, near the bottom thereof.

The openings 22 would be of a size adequate to permit water and other liquids to pass through them, and still catch any precipitates, or solid matter poured into the sink, the number of openings being large enough to permit a free flow of liquids through the strainer, even after a certain amount of solid matter is accumulated above the perforated lower wall.

A plurality of grooves 25, of arcuate or other suitable form, may be cut across the upper end of the flange 21, the bottom surface of the grooves sloping downward from the outer edge of the flange toward the center, to provide a free flow of liquids accumulated in the sink, into the strainer, and through the strainer openings. The upper edge 26, of the strainer flange, may also be dished as indicated in Fig. 1, to allow the liquids to flow freely towards the strainer openings, thence into the drain.

Some liquids, such as mercury, are highly injurious to lead fittings and traps, when they get into the plumbing system.

In order to catch any mercury, other heavy liquids, or suspended precipitates, which may pass through the strainer openings, a cup 27, the outer edge of which may be tapered to fit the tapered counterbore 20, may be inserted in the fitting below the strainer, as indicated in Fig. 1, the bottom 28 of the cup, resting on, or clearing, a set of cross bars 29 and 30, of circular or other suitable cross-section, the cross bars being formed integral with the outer wall 31 of the mounting section of the fitting, below the tapered counterbore. The cup would also be cast of chemically pure lead or a similar material.

The cup 27, may be formed with a tapered outer wall having a plurality of U-shaped or other suitable form of slots 32, cut through the outer circumference thereof, to permit water and other liquids discharged from the interior of the cup to pass through the opening 33, at the center of the fitting, and into the drains.

A relatively thin outer wall 34, of substantially circular cross-section, may be formed integral with the body of the cup, the wall projecting upward for a short distance above the cup body. A plurality of rectangular, U-shaped or other suitable form of slots 35, may be formed through the upper edge of the outer wall to permit overflow liquids, in the cup, to pass through these slots, thence through the slots 32, formed in the outer circumference into the drain. In order to increase the capacity of the cup, a plurality of substantially cylindrical, thin-walled auxiliary cups, or sumps 36, may be formed integral with the bottom of the cup, the spacing of the outer circumferences of the auxiliary cups clearing the edges of the cross-bars 29 and 30, in the fitting.

The bottom 37, of the sumps may be of hemispherical form, as indicated in Fig. 7 or relatively flat, depending upon the diameter of the sump, and design preference.

A cylindrical projecting pin 38, may be formed integral with the bottom of the cup or attached thereto by other means, the upper end of the pin projecting through an opening 39, formed in the center of the bottom wall of the strainer, to permit the cup, or the strainer and the cup simultaneously to be lifted out of the fitting for cleaning, or to dispose of any mercury, or precipitates deposited in the interior of the cup.

In household or commercial installations, or other installations in which mercury, or injurious precipitates are not encountered, the cup 27 may be eliminated, the strainer being utilized independently in the position shown in Fig. 1.

Another embodiment of the construction, shown in Fig. 3, utilizes a fitting 10, substantially the same as that shown in Fig. 1, which is attached to the bottom of the sink in substantially the same manner.

A set of extension overflow tubes 40 and 41 may be mounted in the fitting, the tapered mounting section 42 of the lower overflow tube fitting the tapered counterbore 20 formed at the top of the fitting.

The overflow tube, of substantially circular cross-section, may be cast of chemically pure lead or other similar material.

At the upper end of the lower overflow tube, a tapered seat 43 may be formed, with a tapered lower projection 44, of the upper extension overflow tube fitted into it. A plurality of U-shaped or other suitable form of slots 45 may be cut through the outer wall 46 at the top of the lower overflow tube, to allow the liquids in the sink to pass through the slots into the substantially cylindrical opening 47 formed in the interior of the tube, thence down through the opening 33 in the fitting to the drain, when only one tube section is used.

A similar set of slots 45 may be cut through the upper end of the extension overflow tube 41, where a set of two tubes is used.

Where additional height is required a tapered seat 43 may be provided in the upper end of the upper overflow tube, to allow an additional extension tube 41 (not shown) to be inserted, thus increasing the maximum liquid height in the sink.

Where multiple overflow tubes are used, the tapered projection 44, mounted in the tapered seat, seals the slots 45 formed at the upper end of the lower tube, thus retaining the liquid level at a point approximating the level of the top of the upper extension, or the upper end of the top extension where more than one extension is used.

A substantially circular flange 48, may be formed above the tapered projection 44 near the bottom of the upper tube, the flange resting on the upper edge of the lower tube, where a straight fitting is used, or clearing it slightly, where the tapered projection is used, the taper in the seat and the projection locating the tube axially.

In order to catch any mercury or other injurious precipitates which may pass through the overflow tubes, a cup 27, substantially the same as the cup shown in Figs. 1 and 7 and hereinbefore described, may be mounted in the tapered counterbore 20 of the fitting, above the crossbars, as indicated in Fig. 3.

Figs. 8, 9 and 10 show a drainbowl 52, cast of chemically pure lead, or other similar material, the body 53 of which may be made of substantially oval or other suitable form as indicated in Fig. 9.

A strainer 54, the bowl 55 of which may be made of oval or other cross-section to fit the interior of the bowl body, may be mounted in the body as indicated in Fig. 8.

The lower section of the strainer may be made of circular cross-section, the outer wall 56 being tapered to fit the tapered seat 57, formed in the substantially tubular mounting section 58, of the drainbowl, having threads 15, formed on the outer circumference thereof.

A nut 14, or other suitable attaching means, may be mounted on the external threads 15 of the mounting section, to grip the tubular section against the bottom of the sink in a manner similar to that shown in Fig. 1.

The bottom wall 60 of the strainer, having a plurality of circular or other form of openings 61 cut through it, may be formed integral with the outer wall 56, in a manner substantially the same as the strainer shown in Figs. 1 and 2, to catch any solid matter which drops into the drainbowl.

A plurality of corrugations 62 may be formed around the entire circumference of the strainer bowl 55, the upper edge 63 of the corrugated bowl wall, extending a short distance above the lower wall of the drainbowl body, as indicated in Fig. 8.

The corrugations, formed through the entire wall of the strainer bowl may be located radially, toward the center of the perforated bottom wall, as indicated in Fig. 9, to direct the flow of the liquids toward the perforated section.

The outer convolutions of the strainer bowl wall form a series of tapered grooves 65 around the entire outer circumference of the strainer bowl, thus forming a series of gaps between the strainer body and the interior of the drainbowl body, to allow any liquids which pass over the upper edge of the strainer bowl, when the perforated section becomes clogged, to flow down through the grooves 65 to the outlet opening 66 in the tubular mounting section of the drainbowl.

Fig. 11 shows a section through the lower section of the strainer showing the lower end of the grooves 65, formed radially around the outer wall 56 of the mounting section of the strainer.

A small cylindrical extension pin 67, may be formed integral with the bottom wall of the strainer, similar to the pin shown in Fig. 7, the pin serving as a means of manually lifting the strainer out of the drainbowl 52, in order to clean the strainer.

A pair of cross-bars 29 and 30, substantially the same as those shown in Fig. 1, may be formed integral with the outer wall of the tubular mounting section of the drainbowl.

In installations in which mercury or precipitates which may be injurious to lead fittings are likely to be used, a cup 27, as indicated in Figs. 1, 6 and 7, may be mounted in the tapered seat 57 below the bottom of the strainer wall.

With this construction the pin 67 shown at the center of the perforated bottom wall 60 of the strainer in Fig. 8, would be eliminated, and a central opening 39, similar to that shown in the strainer of Figs. 1 and 2 substituted therefor.

In this manner the pin 38, formed in the cup 27 of Fig. 7, would project through the opening in the bottom wall of the strainer, so that it could be used to lift both the cup and the strainer simultaneously in the manner hereinbefore described, in order to remove the strainer and cup for cleaning or other purposes.

The size and shape of the fittings shown in Figs. 1 and 3 may be altered considerably to suit the requirements of a particular installation, and to fit the sink in which the fittings are mounted.

In place of the nut shown in Figs. 1 and 3, other suitable means of attaching the fitting or the drainbowl to the sink may be substituted.

The size and form of the openings cut through the strainer wall of Figs. 1 and 2 may be altered considerably, depending upon the size of the fittings and the type and particle size of the materials and precipitates encountered in a particular installation.

The contour and cross-section of the drainbowl, shown in Figs. 8 and 9, may be varied, depending upon the requirements of a particular installation.

Where a drainbowl of circular or other contour is used, the construction of the drainbowl body and the strainer bowl would be essentially the same as that shown in Figs. 8 and 9, the corrugations and grooves being substantially the same.

The strainer, shown integral with the strainer bowl may be made as a separate, replaceable unit, substantially the same as that shown in Fig. 1.

The method of attaching the drainbowl to the sink, may be altered considerably, depending upon the size of the unit, and the construction of the sink on which it is mounted.

In place of the corrugated wall used in the strainer bowl of Figs. 8 and 9, the inner surface of the wall may be left relatively smooth, a series of substantially radial grooves being formed in the outer wall of the strainer bowl, to provide a run-off for the liquids in the drainbowl.

While designed particularly for laboratory use, the strainer cup and drainbowl, herein described, may be used in ordinary commercial installations, or even in household installation, where chemicals, precipitates of various kinds, or solid matter are likely to be encountered.

While chemically pure lead is specified as the preferable material of which the fittings and attachments are cast, other materials having the same general non-corrosive properties and casting characteristics, may be substituted for laboratory use. In commercial installations or household installations, castings, or die castings made of a wide variety of materials may be used, the exposed surfaces being coated or plated to resist corrosion.

It will be apparent to those skilled in the art that my present invention is not limited to the specific details described above and shown in the drawings, and that various further modifications are possible in carrying out the features of the invention without departing from the spirit and scope of the appended claims.

What I claim is:

1. A drain fitting for mounting in a sink, said fitting having a tubular support member formed integral therewith, means removably clamping said support member to the sink, a strainer detachably mounted within the fitting support member, said strainer comprising an outer wall of substantially circular contour, said outer wall being demountably fitted to a corresponding seat formed in the fitting support member, and a bottom wall formed integral with said outer wall, said bottom wall having a plurality of openings formed therethrough, a cup for retaining material injurious to the fitting, demountably supported in the fitting in axial alignment with the strainer, said cup comprising an outer wall of frusto-conical contour demountably fitted to the seat formed in the fitting, and a bottom wall formed integral with said outer wall, said outer wall having a plurality of slots formed therein to allow the overflow liquids in the cup to pass through the slots to an opening formed in the fitting support member, the cup bottom wall having a plurality of hollow substantially cylindrical sumps integral therewith, a central pin integral with the cup bottom wall, said central pin passing through the strainer bottom wall for simultaneously removing the cup and the strainer from the fitting.

2. A drain fitting for mounting in a sink, said fitting having a tubular support member, formed integral therewith, means threadably attached to the support member removably clamping the support member to the sink, a strainer detachably mounted within the fitting support member, said strainer comprising an outer wall of substantially frusto-conical form, said outer wall being demountably fitted to a corresponding frusto-conical seat formed in the fitting support member, a bottom wall formed integral with said outer wall, said bottom wall having a plurality of openings formed therethrough, the upper edge of the strainer wall having a plurality of grooves formed therein to guide the flow of the waste materials in the sink toward the strainer openings, a cup for retaining materials injurious to the fitting mounted in said fitting support member in axial alignment with the strainer, said sediment cup comprising an outer wall frusto-conical form, said outer wall being fitted to the seat formed in the fitting support member, a bottom wall formed integral with said outer wall, said outer wall having a plurality of slots formed therein to allow the overflow liquids in the cup, to pass through the slots to an opening formed in the fitting support member, the cup bottom wall having a plurality of hollow substantially cylindrical sumps integral therewith, a central pin integral with the cup bottom wall, said central pin passing through the strainer bottom wall for simultaneously removing the cup and the strainer from the fitting.

3. A drain fitting for mounting in a sink, said fitting having a tubular mounting section formed integral therewith, the walls of said mounting section having a plurality of cross-bars formed integral therewith, a nut threadably attached to the mounting section and removably clamping the mounting section to the sink, a sediment cup removably mounted within said fitting mounting section supported by the cross-bars, said cup comprising an outer wall of substantially frusto-conical form, said outer wall being demountably fitted to a corresponding frusto-conical seat formed in the fitting mounting section, a bottom wall formed integral with said outer wall, said outer wall having a plurality of slots formed therein to allow the overflow liquids in the cup to pass through the slots to an opening formed in the fitting mounting section, and a plurality of auxiliary cups formed integral with the bottom wall, said auxiliary cups clearing the cross-bars in the fitting, a strainer removably mounted within said fitting mounting section in axial alignment with the sediment cup, said strainer comprising an outer wall of substantially frusto-conical form, said outer wall being demountably fitted to the seat formed in the fitting mounting section, a top flange and a bottom wall formed integral with the opposite end of said outer wall, said bottom wall having a plurality of openings formed therethrough, the upper edge of said top flange and the strainer outer wall being dished, said upper edge having a plurality of grooves formed therein to guide the waste materials in the sink toward the strainer openings into the sediment cup.

4. A drain fitting for mounting in a sink, said fitting having a tubular mounting section formed integral therewith, the walls of said mounting section having a plurality of cross-bars formed integral therewith, a nut threadably attached to the mounting section and removably clamping the mounting section to the sink, a sediment cup mounted within said fitting mounting section and supported by the cross-bars, said cup comprising an outer wall of frusto-conical form, said outer wall being fitted to a corresponding frusto-conical countersunk seat, formed in the fitting mounting section, a bottom wall formed integral with said outer wall, said outer wall having a plurality of slots formed therein to allow the overflow liquids in the cup to pass through the slots, to an opening formed in the fitting mounting section, and an extension outer wall formed integral with said outer wall, said extension wall clearing the slots formed in the outer wall, the extension wall having a plurality of slots formed through the open end thereof, said slots allowing the overflow liquids, in the cup, to pass through the outer wall slots, a strainer mounted within said fitting mounting section in axial alignment with the sediment cup, said strainer comprising an outer wall of substantially circular contour, said outer wall being tapered to demountably fit the seat, formed in the fitting mounting section, a top flange and a bottom wall formed integral with the opposite end of said outer wall, said bottom wall having a plurality of openings formed therethrough, the upper edge of said top flange and the strainer outer wall being dished, said upper edge having a plurality of grooves formed therein, to guide the waste materials in the sink toward the strainer openings into the sediment cup.

5. A sink drain fitting comprising a tubular support member integral with the fitting, means clamping the support member to a sink, a strainer detachably supported in the fitting, said strainer having a frusto-conical outer wall, with a bottom wall integral with the outer wall, the bottom wall having a plurality of openings therethrough, the outer wall having a plurality of open grooves cut therethrough, a cup adapted for retaining material injurious to the fitting demountably supported in the fitting in axial alignment with the strainer, said cup having a frusto-conical outer wall, with a bottom wall integral with the outer wall, the outer wall having a plurality of slots through the open end thereof, the bottom wall having a plurality of auxiliary sumps integral therewith, a central pin integral with the cup bottom wall, said pin passing through the strainer bottom wall for simultaneously removing the cup and the strainer from the fitting.

ANTHONY V. SANTARSIERO.

References Cited in the file of this patent

UNITED STATES PATENTS

| Number | Name | Date |
|---|---|---|
| 433,650 | Fairchild | Aug. 5, 1890 |
| 507,237 | Montgomery | Oct. 24, 1893 |
| 596,763 | Stretch | Jan. 4, 1898 |
| 628,146 | Hungerbuehler | July 4, 1899 |
| 904,539 | Koenig | Nov. 24, 1908 |
| 1,224,712 | Clark | May 1, 1917 |
| 1,451,931 | Vallier | Apr. 17, 1923 |
| 1,451,943 | DeWallace | Apr. 17, 1923 |
| 1,587,240 | Olson | June 1, 1926 |
| 1,742,281 | Rundlett | Jan. 7, 1930 |
| 1,950,817 | Rossman | Mar. 13, 1934 |
| 2,079,038 | Ranish | May 4, 1937 |
| 2,107,126 | Pasman | Feb. 1, 1938 |
| 2,288,532 | Knapp | June 30, 1942 |
| 2,331,055 | Smith | Oct. 5, 1943 |
| 2,387,035 | Miller | Oct. 16, 1945 |

FOREIGN PATENTS

| Number | Country | Date |
|---|---|---|
| 204,114 | Switzerland | July 1, 1939 |
| 308,611 | Germany | Aug. 7, 1914 |